United States Patent [19]
Thompson et al.

[11] 3,760,077
[45] Sept. 18, 1973

[54] INJECTABLE COMPOSITIONS OF THE (PLUS)-OPTICAL ISOMER OF THE ALPHA RACEMATE OF 2-(2-ETHYL-2-PHENYL-1,-DIOXOLAN-4-YL)PIPERIDINE AND THEIR USE

[75] Inventors: Charles R. Thompson, Walnut Creek; John Hidalgo, Oakland, both of Calif.

[73] Assignee: Cutter Laboratories, Inc., Berkeley, Calif.

[22] Filed: Oct. 15, 1971

[21] Appl. No.: 189,760

Related U.S. Application Data

[63] Continuation-in-part of Ser. No. 800,282, Feb. 18, 1969, Pat. No. 3,655,680.

[52] U.S. Cl. .............................................. 424/267

[51] Int. Cl. ............................................ A01k 27/00
[58] Field of Search ................................... 424/267

[56] References Cited
UNITED STATES PATENTS
3,262,938   7/1966   Hardie et al. .................... 260/294.7

*Primary Examiner*—Albert T. Meyers
*Assistant Examiner*—Allen J. Robinson
*Attorney*—I. William Millen et al.

[57] ABSTRACT

Injectable compositions of the (+) optical isomer of the alpha racemate of 2-(2-ethyl-2-phenyl-1,3-dioxolan-4-yl)piperidine, in free base or acid addition salt form, and their use as a general anesthetic, immobilizing or calming agent or depressant.

21 Claims, No Drawings

INJECTABLE COMPOSITIONS OF THE (PLUS)-OPTICAL ISOMER OF THE ALPHA RACEMATE OF 2-(2-ETHYL-2-PHENYL-1, -DIOXOLAN-4-YL)PIPERIDINE AND THEIR USE

This is a continuation-in-part of application Ser. No. 800,282, filed Feb. 18, 1969, now U.S. Pat. No. 3,655,680.

BACKGROUND OF THE INVENTION

This invention relates to compositions comprising an optical isomer of 2-(2-ethyl-2-phenyl-1,3-dioxolan-4-yl)piperidine and to their use.

U.S. Pat. 3,262,938, issued July 26, 1966, discloses a class of 2-substituted-4-(2-piperidyl)-dioxolanes, including in Example 12 the alpha racemate of 2-ethyl-2-phenyl-4-(2- piperidyl)-1,3-dioxolane, the isomer of this invention being the (+)-optical isomer thereof. It is disclosed to possess spasmolytic, anticonvulsant and central nervous system depressing activity. It is prepared by reacting the alpha racemate of 2-piperidyl-1,2-ethanediol hydrochloride with 1-phenyl-1,1-dipropxy-propane. Optical isomers of other dioxolanes are prepared, as disclosed in Examples 7–10 of that patent, by forming an acid addition salt of the corresponding racemate with an optically active acid and separating the optical isomers of the acid addition salt by fractional crystallization.

SUMMARY OF THE INVENTION

According to this invention, there is provided novel compositions adapted for parenteral administration comprising a pharmaceutically acceptable acid addition salt of the (+) optical isomer of the alpha racemate of 2-(2-ethyl-2-phenyl-1,3-dioxolan -4-yl)piperidine, substantially free from its isomers. In a method of use aspect, such a composition is injected parenterally, preferably intramuscularly, into a mammal, preferably a feline or primate, in a calming (at lower dosages) or immobilizing (at higher dosages) amount, less than that which induces general anesthesia. In a preferred aspect, the composition is injected parenterally, preferably intravenously, in a mammal, preferably a primate, in an amount effective to induce general anesthesia.

DETAILED DISCUSSION

The (+) optical isomer of the alpha racemate of 2-(2-ethyl-2-phenyl-1,3-dioxolan-4-yl)piperidine possesses useful and unexpected pharmacological activity, including general anesthetic, immobilizing muscle relaxant, analgesic, spasmolytic, and anti-convulsant activity. This optical isomer has four times the intravenous general anesthetic activity of its parent racemate, i.e., the compound of Example 12 of U.S. Pat. No. 3,262,938. This is totally unexpected because if one optical isomer of an active racemate is active and the other is inactive, the racemate ought possess half the activity of its active optical isomer. The fact the (+) optical isomer of this invention is four times as active as an i.v. anesthetic as its racemate establishes the (−) optical isomer is not only inactive, it apparently interferes with the general anesthetic activity of the (+) isomer when combined therewith as a racemic mixture. Also, the compound of this invention has a better anesthetic activity to side-effects ratio than the racemate.

The immobilizing and general anesthetic activity is manifested upon parenteral administration in primates without markedly depressing respiration. It is a dissociative anesthetic of the type described by Domino et al., in Clinical Pharmacology and Therapeutics, 6:279 (1965). A dissociative anesthetic is one which renders the anesthetized individual incapable of relating to his surroundings and procedures undertaken upon him. This compound is also a useful adjunct to known general anesthetics. In addition to its general anesthetic activity, the compound of this invention provides good muscle relaxation, an important and valuable co-activity for a general anesthetic. The character of the general anesthetic activity of the compound of this invention varies considerably from species to species, i.e., in dogs and rats, which are two commonly used laboratory test animals, the compound does not readily produce the narcosis generally associated with this activity, but does so in primates, e.g., monkeys and man, and in felines, e.g., domestic cats. Thus, it was surprising to discover that this compound possesses highly useful general anesthetic activity since it appeared to lack this activity when tested in screening tests employing dogs or rats because the animals were not completely immobilized, even at relatively high dosages (2.5, 5 and 10 mg./kg. i.v.). Further studies did, however, reveal general anesthetic activity in dogs at dosages which did not induce narcosis. See Traber et al., J. Pharm. & Exp. Ther. 175, 395-403 (1970). Additionally, the compound exhibits anti-convulsant, analgesic, central nervous system depressant, spasmolytic and local anesthetic effects. The analgesic activity of the compound of this invention is unusual in that complete analgesia can be induced, as demonstrated by indifference to noxious and painful stimuli, without inducing a comatose state.

The compositions of this invention are particularly advantageous when used as a general anesthetic for several reasons. They have a long duration of anesthesia, a short induction period and relatively little adverse side-effects. They produce amnesia of the surgical episode. Post-operative analgesia reduces considerably the necessity for post-operative medication to reduce pain.

The compositions of this invention are particularly useful as a basal anesthetic, i.e., administered intravenously or intramuscularly in an amount just sufficient to achieve light or marginal anesthesia, with or without accompanying narcosis, and supplement this effect by concurrent or subsequent administration of another anesthetic, e.g., sodium pentothal, preferably an inhalation anesthetic, e.g., nitrous oxide, diethyl ether, 2,2-dichloro-1,1-difluoroethyl methyl ether, etc., to achieve surgical anesthesia. Such a combination has the advantage that the inhalation anesthetic can be administered at lower concentrations, simultaneously with oxygen, oxygen and nitrogen mixtures, e.g., 40% oxygen and 60% nitrogen, or air, thus avoiding or reducing the incidence of respiratory distress associated with the use of these anesthetics in a conventional manner to induce surgical anesthesia.

The compositions of this invention also have useful general anesthetic activity when administered intramuscularly. In addition, by this route of administration, using sub-anesthetic dosages, they can be used to subdue wild animals, especially of the feline family, and immobilize domestic animals and primates. The compositions of this invention are particularly useful for their immobilizing effect because they have a higher $ED_{50}/LD_{50}$ ratio than the compositions, e.g., curare derivatives, presently employed for this purpose. Moreover, because they are not toxic when administered intravenously, the accidental administration intravenously does not produce the serious sequel of events which occur with drugs which can only be administered intramuscularly. They are useful adjuncts to psychiatric therapy, inducing a suggestible state which facilitates the diagnosis and treatment of a wide variety of mental disorders.

The active compound of the compositions of the invention is slightly water-soluble and is most stable at pH 6 or higher. It is less stable below pH 6. Inasmuch as general anesthetics are commonly administered intravenously, in order to rapidly induce and carefully maintain anesthesia, a preferred embodiment of the compound of this invention is in a sterile aqueous solution of a pharmacologically acceptable acid addition salt, preferably a buffered solution, e.g., containing from 0.1 to 5 percent, of the compound of this invention. A suitable buffer is sodium succinate. Antimicrobial agents may be added to the solution of the compound of this invention, e.g., when packaged in multiple dose containers, e.g., benzethonium chloride or benzalkonium chloride, at a concentration of about 0.01 percent.

Other routes of administration besides intravenous are useful, particularly when the compound is used other than as an i.v. anesthetic. In a preferred embodiment of this invention, the active compound is in the form of a pharmaceutically acceptable acid addition salt in a composition adapted for intramuscular injection. These compositions can be either aqueous or oily suspensions or aqueous solutions. The active compound is preferably present therein at a concentration of between 0.5 and 5.0%.

The active compound of the compositions of this invention, viz., alpha(+)-2-ethyl-2-phenyl-1,3-dioxolan-4-yl)piperidine, can be employed in free base form or preferably as a pharmaceutically acceptable acid addition salt. The latter can be prepared in the conventional manner by reacting the free base form with an inorganic or organic acid. Because of their greater solubility in conventional pharmaceutically acceptable carriers the salt forms are employed for the administration of the compounds for the pharmacological purposes set forth herein. In other respects the acid addition salt form of the compound of this invention is the equivalent of the free base form. Examples of pharmaceutically acceptable salts are water soluble salts of inorganic acids, e.g., hydrochloric, hydrobromic, hydiodic, nitric, sulfuric and phosphoric acid, and salts of organic acids, including aliphatic, alicyclic, araliphatic, aromatic and heterocyclic, mono- or polybasic carboxylic acids, e.g., formic acid, acetic acid, propionic acid, diethylacetic acid, malonic acid, succinic acid, pimelic acid, fumaric acid, maleic acid, lactic acid, tartaric acid, malic acid, amino-carboxylic acids, citric acid, gluconic acid, ascorbic acid and sulfonic acids, e.g., methanesulfonic, ethanesulfonic and p-toluenesulfonic acids.

The active compound of the compositions of this invention is formulated with conventional pharmaceutical excipients adapted for parenteral administration. Aqueous solutions are preferred for intraveneous administration. Oily and aqueous solutions and emulsions, as well as aqueous solutions can be employed for intramuscular administration.

The compositions of this invention are usually administered by infusion intravenously as a dilute solution, e.g., 0.5 - 2.0% of the active compound in sterile water, preferably also containing about 0.01% of benzethonium chloride and about 0.05 - 0.07 M sodium succinate or phosphate buffer sufficient to maintain a pH of about 6.5 - 7.3.

The exact dosage depends more upon the species than route of administration. For example, although 0.5 - 20 mg./kg. intramuscularly and intravenously will generally suffice for all species, only about 0.5 - 2.5 mg./kg. is required for humans, 2.5 - 5.0 mg./kg. is required for monkeys, whereas 15 - 25 mg./kg. is required for cats for major surgical anesthesia.

Because 2-(2-ethyl-2-phenyl-1,3-dioxolan-4-yl)piperidine has three asymmetric carbon atoms, it can exist as four different racemic mixtures. Three of these are specifically disclosed in U.S. Pat. No. 3,262,938. The two racemates produced from the alpha racemate of 2-piperidyl-1,2-ethanediol (the hydrochloride of which melts at 100 - 101°) are designated "alpha racemate" (Example 12) and "gamma racemate" (Example 13). Of the two racemates which were produced from the beta racemate of 2-piperidyl-1,2-ethanediol (whose hydrochloride melts at 139–141°), the one which was isolated was designated the "beta racemate." The compound of this invention is the dextrorotatory optical isomer of the alpha racemate of 2-(2-ethyl-2-phenyl-1,3-dioxolan-4-yl)piperidine. Nuclear magnetic rotation spectra have established the piperidine ring and the phenyl ring are trans with respect to the dioxolane ring.

The compound of this invention can be prepared from the alpha racemate of Example 12 of U.S. Pat. No. 3,262,938 in the conventional manner, e.g., by forming an acid addition salt of the free base thereof with an optically active acid and fractionally crystallizing the resulting mixture to separate the optical isomers. Preferably, however, it is prepared according to the process set forth in the preparations hereinafter.

It was established that the optical isomer of this invention is the (+) optical isomer of the alpha racemate of Example 12 of U.S. Pat. No. 3,262,938, rather than the (+) optical isomer of the gamma racemate of Example 13, by following the procedure described in Preparation 1 herein using the (−) optical isomer of the alpha racemate of 2-(2,2-diphenyl-1,3-dioxolan-4-yl)piperidine of Example 10 of U.S. Pat. No. 3,262,938, to produce the (+) optical isomer of the alpha racemate of 2-piperidyl-1,2-ethanediol of Preparation 14 of U.S. Pat. No. 3,262,938. This compound was then reacted with propiophenone dipropyl acetal and a levorotatory optical isomer of 2-(2-ethyl-2-phenyl-1,3-dioxolan-4-yl)piperidine was isolated. A 50:50 physical mixture of this optical isomer and the (+) optical of this invention when recrystallized produced the alpha racemate of Example 12 of U.S. Pat. No. 3,262,938.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Preparation 1 Alpha (+)2-(2-ethyl-2-phenyl-1,3-dioxolan-4-yl)piperidine hydrochloride A solution of 477 g. of the (+) optical isomer of the alpha racemate of 2-(2,2-diphenyl-1,3-dioxolan-4-yl)piperidine hydrochloride (U.S. Pat. No. 3,262,938, Example 9) in 1500 ml. methanol, 25 ml. water and 20 ml. concentrated hydrochloric acid was refluxed two hours. Most of the methanol was removed by distillation and the concentrate was diluted with 1,500 ml. ether. The crystalline product which precipitated was filtered, washed with ether and recrystallized from isopropanol and dried to give 240.9 g. of alpha(—)2-piperidyl-1,2-ethanediol hydrochloride, melting at about 137–139°; $\alpha D\ 25 = -8.12$ Analysis:

Calcd. for $C_7H_{15}NO_2$ HCl: C, 46.28; H, 8.88; N, 7.71; Cl, 19.52

Found: C, 46.02; H, 8.84; N, 7.87; Cl, 19.46

A mixture of 1,017 g. of alpha (—)2-piperidyl-1,2-ethanediol hydrochloride and 1,592 g. of propiophenone dipropyl acetal (U.S. Pat. No. 3,262,938) in 6 liters of anhydrous isopropanol was brought to reflux and a solution of anhydrous hydrogen chloride in propanol was added to bring the pH between 1 and 2. The solution was refluxed about 2 hours, allowed to remain at room temperature overnight and the crystalline product which formed was recrystallized twice from isopropanol and dried to give alpha(+)-2-(2-ethyl-2-phenyl-1,3-dioxolan-4-yl)piperidine hydrochloride, melting at about 221.5 – 222.0°; $\alpha D\ 25 = -16.63$ Analysis:

Calcd. for $C_{16}H_{23}NO_2$ HCl: C, 64.52; H, 8.12; N, 4.70; Cl, 11.90

Found: C, 64.37; H, 7.93; N, 4.79; Cl, 8c 11.83

The solvent was removed from the mother liquors and the residue was heated for several hours in refluxing propanol containing anhydrous hydrogen chloride and additional propiophenone dipropyl acetal. Isolation of crystalline product in the manner described above yielded an addtional amount of the alpha(+)—isomer.

Preparation 2 Alpha (+)2-(2-ethyl-2-phenyl-1,3-dioxolan-4-yl)piperidine maleate

An aqueous solution of the hydrochloride salt of Preparation 1 was rendered basic with dilute sodium hydroxide solution and the free base was extracted with ether. The ether solution was dried over magnesium sulfate, filtered, and the ether was removed. A molar equivalent of maleic acid in ethanol was added to the free base and the solution was diluted with dry ether. The crystalline product was recrystallized from isopropanol to give alpha(+)2-(2-ethyl-2-phenyl-1,3-dioxolan-4-yl)piperidine maleate, melting at about 127.5 –128.5°.

Analysis:

Calcd. for $C_{16}H_{23}NO_2 \cdot C_4H_4O_4$: C, 63.65; H, 7.21; N, 3.71

Found: C, 63.66; H, 7.10; N, 3.57

EXAMPLE 1

For intravenous administration, form a 0.5 – 2% sterile aqueous solution of alpha(+)2-(2-ethyl-2-phenyl-1,3-dioxolan-4-yl)piperidine hydrochloride. For administration to humans, infuse in a lactated Ringer's solution.

EXAMPLE 2

For intramuscular administration, prepare a 2 – 5% sterile aqueous solution of alpha(+)2-ethyl-2-phenyl-1,3-dioxolan-4-yl)piperidine hydrochloride.

To obtain a longer-acting composition dissolve the (+)optical isomer of the alpha racemate of 2-(2-ethyl-2-phenyl-1,3-dioxolan-4-yl) piperidine in a suitable oil, e.g., corn, peanut, cotton-seed or sesame oil.

EXAMPLE 3 USE AS INTRAVENOUS ANESTHETIC IN MONKEYS

The surgical opening of the abdomen or laparotomy was accomplished in African Green Monkeys (cercopithecus aethiops) using the minimal effective dose shown in the table below, of a composition of Example 1, administered intravenously as a one percent aqueous solution. The onset is the time in minutes at which the monkey was released unrestrained. Duration is the time in minutes after onset of anesthesia when the monkey began to lift his head or attempted to rise from the table. Abdominal muscles were easily manipulated during the procedure due to the muscle relaxant properties of the compound. The surgical procedure was an incision of about 5 to 10 centimeters at the midline of the abdomen. Each muscle layer was separated and the peritoneum opened. The liver was probed before the wound was closed layer-by-layer. The surgery was completed in ten to 15 minutes. The results of the experiments are set forth below:

| Monkey Wt. & Sex | Dose mg/kg | Anesthesia Onset (minutes) | Duration (minutes) |
|---|---|---|---|
| 3.35 Kg. Male | 5 | 2 | 30 |
| 2.4 Kg. Male | 5 | 2 | 64 |
| 2.45 Kg. Female | 5 | 1 | 67 |
| 2.45 Kg. Female | 2.5 | 0.5 | 27 |
| 2.5 Kg. Female | 2.5 | 0.5 | 28 |
| 3.4 Kg. Female | 2.5 | 0.4 | 32 |

Similar results are observed when the compound of this invention is used as a general anesthetic for surgical purposes in other primates, e.g., man, apes, chimpanzees, etc.

EXAMPLE 4 USE AS INTRAVENOUS ANESTHETIC IN HUMANS

The following is a summary of the results of testing in human volunteers reported by Wilson et al., Anesthesia and Analgesia . . . Current Researches, Vol. 49, No. 2, pp. 236–241 (1970).

Thirteen male Caucasian medical students, all pair volunteers, were accepted for the study from a screen of 29 individuals. Mean age of the group was 23.6 years (range 22 to 25 years). Their mean weight was 173 pounds (range of 150 to 205 pounds). The subjects were fasted at least four hours before being tested.

The moment for administering the test drug came at a time unknown to the subject through a separate peripheral intravenous catheter (16-gauge teflon), which had been placed previously and was attached to an infusion bottle of lactated Ringer's solution.

Eleven of the subjects tested received a single dose of 0.75 mg./kg. of alpha(+)2-(2-ethyl-2-phenyl-1,3-dioxolan-4-yl)piperidine hydrochloride as a 0.5 percent solution intravenously. One subject received 0.25 mg./kg. and one received 0.50 mg./kg. The dose 0.75 mg./kg. was selected as the maximal necessary for the test, since useful coma was seen at this level in all subjects.

The agent was injected over a 2-minute period. During the time of injection the subject was, as he had been for the hour or more preceding the drug injection, reclining, listening to music through the earphonse, and separated from visual distractions by the eye patches. During the period preceding the drug injection, control data were taken. The subject, after having received the drug, was asked a series of questions and given commands, commencing early and extending into the post-recovery period. Physiologic data were recorded at intervals.

The duration of useful coma varied from 50 to 85 minutes in the 11 subjects receiving the 0.75 mg./kg. dose. The period of profound analgesia exceeded the period described as useful coma by varying amounts in individual subjects; however, an impressive degree of analgesia was present in all subjects up to 2 hours or more. The period of amnesia for recent recall exceeded the useful coma by from 2 to 4 hours in all subjects tested. During the period of reduced analgesia, but complete amnesia, the subject was in possession of all his cognitive factors and was able to perform analytical mental thought processes, as well as past recall, although recent recall was distinctly attenuated in some subjects.

Psychologic and performance of perceptual motor functions as well as psychiatric changes can be summarized by stating that no problems were noted at the time of the 48-hour review, and the drug was concluded from all standpoints to be devoid of effects extending beyond this period.

EXAMPLE 5 USE AS INTRAMUSCULAR ANESTHETICS IN CATS

Ketamine hydrochloride, a known dissociative anesthetic for cats, was compared with alpha(+)2-(2-ethyl-2-phenyl-1,3-dioxolan-4-yl) piperidine hydrochloride. Under sterile conditions, a complete ovariohysterectomy, including removal of the ovaries and the body of the uterus, following the technique for inversion of the uterine stump, was performed on 10 females, seven with alpha(+)2-(2-ethyl-2-phenyl-1,3-dioxolan-4-yl)piperidine hydrochloride and three with ketamine hydrochloride. One laparotomy and one castration was performed on two males with alpha(+)2-(2-ethyl-2-phenyl-1,3-dioxolan-4-yl)piperidine hydrochloride. The laparotomy was used instead of castration because the male was either immature or had been previously castrated.

The time of intramuscular administration (IM) to the end of surgery ranged from 45 – 90 minutes with the actual surgery taking up about 25 minutes.

With both compounds the animals became ataxic in 2 – 4 minutes; preparation for surgery could begin in 4 – 6 minutes; irritation of injection site was not noted other than needle sting; the animals would start walking, though staggering, in 2 – 3 hours; appeared normal though inactive in 24 hours; and appeared normal with activity only slightly limited in 2 – 3 days.

A large amount of salivation was observed in all ketamine anesthetized cats, and none in any alpha(+)2-(2-ethyl-2-phenyl-1,3-dioxolan-4-yl)piperidine hydrochloride cats.

Ketamine hydrochloride was used at the minimum dose recommended by the supplier, viz., 33 mg./kg. IM, in a solution of 100 mg./cc. The first alpha(+)2-(2-ethyl-2-phenyl-1,3-dioxolan-4-yl)piperidine hydrochloride cat was anesthetized at one half the minimum recommended dose of ketamine, viz., 16.5 mg./kg. IM in a 100 mg./cc. solution. However, alpha(+)2-(2-ethyl-2-phenyl-1,3-dioxolan-4-yl)piperidine hydrochloride began to precipitate after standing, and all other alpha(+)2-(2-ethyl-2-phenyl-1,3-dioxolan-4-yl)piperidine hydrochloride solutions were made up at 50 mg./cc.

At 7.5 mg./kg. and 10 mg./kg. doses, 2.5 mg./kg. and 0.1 mg./kg. supplemental doses, respectively, were required. At 15 and 16.5 mg./kg., anesthesia was sufficient for the surgical procedure.

From the results of these experiments, it was determined that for surgery lasting less than one hour, 15 mg./kg. IM is an effective dose of alpha(+)2-(2-ethyl-2-phenyl-1,3-dioxolan-4-yl)piperidine hydrochloride, whereas 33 – 44 mg./kg. IM of ketamine hydrochloride was required for anesthesia lasting 30 – 45 minutes. To insure profound anesthesia for surgery of 60 – 90 minutes, 22 mg./kg. of alpha (+)2-(2-ethyl-2-phenyl-1,3-dioxolan-4-yl)piperidine hydrochloride is preferred.

EXAMPLE 6 USE FOR IMMOBILIZATION OF MONKEYS VIA INTRAMUSCULAR ADMINISTRATION 2.0 and 4.0 mg./kg., respectively, of the maleic acid addition salt of alpha(+)2-(2-ethyl-2-phenyl-1,3-dioxolan-4-yl)piperidine as a 1 and 2% aqueous solution, respectively, were administered intramuscularly in the thigh of two female green monkeys. The effects were noted as follows:

Monkey 1 (minutes after injection):
6. first indications of drug effect;
7. sat and did not move;
8. rubbed eyes and appeared sleepy;
12. lateral nystagmus;
16. did not struggle when removed from the cage, calm and did not resist handling -- pressure applied to the orbital ridge did not elicit any response;
19. ataxic - loud noises did not startle it;
24. sat quietly;
39. still in a sitting position but reacted to loud noises;
49. more aware of the surroundings;
71. picked up food, but did not eat;
74. standing but still slightly ataxic.

Monkey 2 (minutes after injection):
2. rubbed thigh where injected;
3. ataxic;
4. sat quietly;
5. vertical nystagmus;
6. began to yawn and head trembled - monkey could not hold its head up any longer and gradually laid down;
8. fist clenched and eyes wide open;
10. abdominal muscles relaxed, but the fists still clenched and difficult to open - no salivation present;
21. arms and legs were relaxed;
29. attempted to raise its head;
35. yawned and still attempted to raise its head;
41. no reaction to pinching of the skin with a hemostat or pressure applied to the orbital ridges;
51. reacted to pressure applied to the orbital ridges;
64. suddenly sat up.

EXAMPLE 7 USE AS INTRAMUSCULAR ANESTHETIC IN MONKEYS

Following the procedure of Example 6, surgically effective general anesthesia is induced by injecting intramuscularly either of the solutions employed therein at a level of 8 mg./kg.

EXAMPLE 8 USE AS BASAL ANESTHETIC IN HUMANS

The hydrochloride acid addition of salt of alpha(+)2-(2-ethyl-2-phenyl-1,3-dioxolan-4-yl)piperidine (CL-1848C) was administered to human patients at dosages of 0.75 or 1.0 mg./kg. body weight prior to surgery. Anesthesia was completed with a 60 : 40% mixture of nitrous oxide and oxygen. The table below lists the details thereof.

An increase in blood pressure and heart rate was reported in all patients. Three of the patients reported surgical amnesia.

| Patient, age/sex | Surgery | Length of surgery | Premedication | Dosage CL-1848C | | Approx. period of induction | Other anesthetic used |
| --- | --- | --- | --- | --- | --- | --- | --- |
| | | | | Initial | Additional | | |
| 1 {M. 38, Male} | Transurethral resection for benign prostatic hyperplasia. | 50 min | None | 1 mg./kg. (71 mg.) | Two ½ doses of 35 mg. each. | 2 min | $N_2O/O_2$. |
| 2 {M. 34, Male} | Amputation of finger | 58 min | Atropine | 1 mg./kg. (100 mg.) | One ½ dose (50 mg.). | 2 min | Pentothal, $N_2O/O_2$. |
| 3 {W. 45, Female} | D & C and cone | 46 min | Valium nembutal | 65 mg | 22 mg | <1 min | $N_2O/O_2$. |
| 4 {H. 30, Female} | do | 21 min | Nembutal, valium, scopolamine. | 37.5 mg | None | 13 min | $N_2O/O_2$. |
| 5 {H. 59, Male} | Exploratory thoracotomy | 2.5 hours | Seconal morphine, scopolamine. | 58 mg | do | 90 seconds | $N_2O/O_2$, 60 mg. succinylcholine halothane. |
| 6 {V. 22, Male} | Pilonidal cyst | 45 min | Nembutal, atropine | 66 mg | do | 20–40 seconds. | $N_2O/O_2$. |

The preceding examples can be repeated with similar success by substituting the generally or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A sterile injectable composition having general anesthetic, immobilizing muscle relaxant, analgesic, spasmolytic, and anti-convulsant activity comprising an effective amount of the (+) optical isomer of the alpha racemate of 2-(2-ethyl-2-phenyl-1,3-dioxolan-4-yl)piperidine in free base form or as a pharmaceutically acceptable acid addition salt, substantially free from its isomers, in admixture with a pharmaceutically acceptable carrier.

2. The composition of claim 1 adapted for intravenous injection in the form of a pharmaceutically acceptable acid addition salt.

3. The composition of claim 2 as a sterile aqueous solution.

4. The composition of claim 3 wherein the addition salt is the hydrochloride.

5. The composition of claim 3 as a 0.1 to 5 percent solution.

6. The composition of claim 1 adapted for intramuscular injection in the form of a pharmaceutically acceptable acid addition salt.

7. The composition of claim 6 as a sterile aqueous solution.

8. The composition of claim 7 wherein the addition salt is the hydrochloride.

9. The composition of claim 7 as a 0.5 to 5.0 percent solution.

10. A method of at least calming a mammal which comprises administering parenterally to the mammal the composition of claim 1 in a non-toxic amount effective to at least calm the mammal.

11. The method of claim 10 wherein the composition is administered as the hydrochloride acid addition salt.

12. The method of claim 10 wherein the composition is administered intramuscularly.

13. The method of claim 10 wherein the composition is administered intramuscularly.

14. The method of claim 13 wherein the composition is administered as the hydrochloride acid addition salt.

15. The method of claim 13 wherein the mammal is of the feline species.

16. The method of claim 13 wherein the mammal is a primate.

17. A method of inducing general anesthesia in a mammal which comprises administering parenterally to the mammal the composition of claim 1 in an amount effective to induce general anesthesia.

18. The method of claim 17 wherein the composition is administered as a basal anesthetic.

19. The method of claim 17 wherein the mammal is a primate.

20. The method of claim 17 wherein the composition is administered intravenously as a sterile aqueous solution adapted for intravenous administration.

21. The method of claim 20 wherein the solution contains between about 0.5 and 2% of the hydrochloride salt.

* * * * *

UNITED STATES PATENT OFFICE
CERTIFICATE OF CORRECTION

Patent No. 3,760,077                Dated September 18, 1973

Inventor(s)   Charles R. Thompson et al.

It is certified that error appears in the above-identified patent and that said Letters Patent are hereby corrected as shown below:

Title Page, line 3 of the Title, insert -- 3 -- after "1,". Column 1, line 3, insert -- 3 -- after "1,". Column 5, line 29, "-16.63" should read -- +16.63 --; line 33, "8c" should be deleted; line 39, "addtional" should be -- additional --; line 67, "alpha (+)2-ethyl-" should be -- alpha (+)2-(2-ethyl- --. Column 6, line 48, "pair" should be -- paid -- Column 7, line 2, "earphonse" should be -- earphones --. Claim 12, second line, delete "intramuscularly" and replace with -- intravenously --.

Signed and sealed this 15th day of October 1974.

(SEAL)
Attest:

McCOY M. GIBSON JR.                C. MARSHALL DANN
Attesting Officer                  Commissioner of Patents